No. 784,965. PATENTED MAR. 14, 1905.
M. V. ROOT.
HARNESS ATTACHMENT.
APPLICATION FILED DEC. 14, 1903.
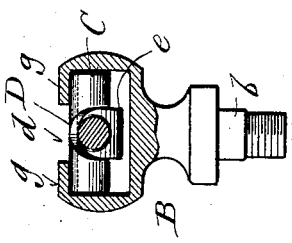
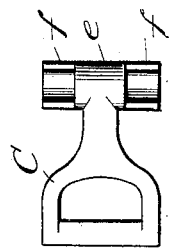
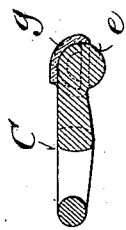
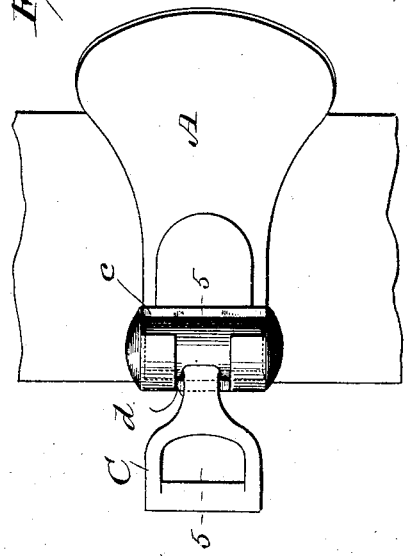

No. 784,965. Patented March 14, 1905.

UNITED STATES PATENT OFFICE.

MANCIL V. ROOT, OF SHEBOYGAN, WISCONSIN, ASSIGNOR TO THOMAS E. CAMP, OF MILWAUKEE, WISCONSIN.

HARNESS ATTACHMENT.

SPECIFICATION forming part of Letters Patent No. 784,965, dated March 14, 1905.

Application filed December 14, 1903. Serial No. 185,072.

*To all whom it may concern:*

Be it known that I, MANCIL V. ROOT, a citizen of the United States, and a resident of Sheboygan, in the county of Sheboygan and State of Wisconsin, have invented certain new and useful Improvements in Harness Attachments; and I do hereby declare that the following is a full, clear, and exact description thereof.

My invention has for its object to provide simple economical harness attachments by which to facilitate checking and unchecking of a horse, said invention consisting in what is hereinafter particularly set forth, with reference to the accompanying drawings, and subsequently claimed.

Figure 1 of the drawings represents a partly-sectional side elevation of a check-hook and post that constitute harness attachments in accordance with my invention, said devices being coupled and the post shown in connection with a fragment of a harness-saddle; Fig. 2, a plan view of the assembly of parts shown in the first figure; Fig. 3, a front elevation of the hook and post, partly in section; Fig. 4, a plan view of the hook inverted; and Fig. 5, a section view of said hook, this view being indicated by line 5 5 in the second figure.

Referring by letter to the drawings, A indicates a fragment of a harness-saddle, and extending through the upper central portion of the same is the depending screw-thread shank *b* of a bracket that constitutes a check-hook post. The post is shown held in place by a nut and washer on its shank; but other suitable means may be employed to serve the same purpose. The head of the post is in the form of a hollow cylinder closed at both ends, but provided with a rear longitudinal opening *c* and a central forward circumferential opening *d*, that intersects the one aforesaid.

Engageable with the hollow cylindrical head of the post aforesaid is the cylindrical end *e* and semicylindrical lateral wings *f* of the shank of a check-hook C, said wings being extended in opposite directions from said shank and caught under overhanging portions *g* of the post-head when the check-hook is swung forward to engage its shank with the circumferential forward opening in said head, it being then impossible to uncouple said hook from said post until it is again swung to the rear, so as to obtain clearance for its wings.

To prevent rattling and obtain friction in the post-head sufficient to insure against automatic uncoupling of the check-hook incidental to head movement on the part of a horse, a packing D, of rubber or other suitable material, is provided on the winged end of said hook, this packing being preferably a sleeve of rubber centrally notched to permit of its being caught at its ends on the hook-shank wings.

Having thus described my invention, what I claim as new, and desire to secure by Letters Patent, is—

A post attachable to a harness-saddle and having a hollow cylindrical head provided with a rear longitudinal opening as well as a forward central circumferential opening intersecting the one aforesaid, and a check-hook the shank of which has a cylindrical end and semicylindrical lateral wings, these wings being extended in opposite directions from said shank and caught under overhanging portions of the post-head when the check-hook is swung forward to engage its shank with the circumferential forward opening in said head subsequent to engagement with the rear longitudinal opening of same.

In testimony that I claim the foregoing I have hereunto set my hand, at Milwaukee, in the county of Milwaukee and State of Wisconsin, in the presence of two witnesses.

MANCIL V. ROOT.

Witnesses:
H. G. UNDERWOOD,
HUGO FAHL.